United States Patent [19]

Schreder et al.

[11] Patent Number: 5,107,488

[45] Date of Patent: Apr. 21, 1992

[54] CIRCUIT ARRANGEMENT FOR SWITCHING A DIGITAL SERVICE CHANNEL THROUGH A RADIO RELAY REPEATER

[75] Inventors: Wolfgang Schreder; Rainer Lüdecke, both of Birkenfeld, Fed. Rep. of Germany

[73] Assignee: Alcatel N.V., Amsterdam, Netherlands

[21] Appl. No.: 553,534

[22] Filed: Jul. 13, 1990

[30] Foreign Application Priority Data

Jul. 22, 1989 [DE] Fed. Rep. of Germany ....... 3924283

[51] Int. Cl.⁵ .......................... H04J 3/08; H04B 3/36
[52] U.S. Cl. ........................ 370/55; 370/97; 370/105.3; 370/110.1
[58] Field of Search .................. 370/13, 13.1, 55, 58.1, 370/97, 100.1, 105.1, 105.3, 110.1; 375/3, 3.1, 4; 178/70 R, 70 T

[56] References Cited

U.S. PATENT DOCUMENTS

| | | | |
|---|---|---|---|
| 4,667,319 | 5/1987 | Chum | 370/55 |
| 4,876,683 | 10/1989 | Suzuki | 370/97 |
| 4,878,219 | 10/1989 | Kaufman et al. | 370/97 |
| 4,935,920 | 6/1990 | Taniguchi et al. | 370/55 |
| 5,018,135 | 5/1991 | Ashi et al. | 370/55 |

Primary Examiner—Douglas W. Olms
Assistant Examiner—Alpus H. Hsu
Attorney, Agent, or Firm—Ware, Fressola, Van Der Sluys & Adolphson

[57] ABSTRACT

A circuit arrangement for switching an externally accessible service channel, formed by additional bits within a digital data signal, contains an output circuit, which shifts the service-channel bits in time as soon as there is a threat of phase coincidence of a receive clock derived from the data signal with the transmit clock generated with an identical or slightly different frequency. Errors produced by an unclear assignment of the service-channel bit to the transmit clock are prevented in this way. The output circuit contains a buffer, a phase detector, and a changeover switch driven by the phase detector. To produce the time shift, the buffer clock is fed to the buffer via an inverter (I) interposed by the changeover switch. A second solution provides for a direct switching of the service signal and the interposition of the buffer clock with the inverted receive clock only during periods in which there is a threat of phase coincidence between the receive clock and the transmit clock.

13 Claims, 5 Drawing Sheets

CIRCUIT ARRANGEMENT FOR SWITCHING A DIGITAL SERVICE CHANNEL THROUGH A RADIO RELAY REPEATER

BACKGROUND OF THE INVENTION

1. Field of the Invention

The present invention relates to repeaters in a digitally-operated radio relay station and more particularly to repeaters that must pass a digital service channel.

2. Description of the Prior Art

In repeaters of digitally-operated radio relay sections, the signal to be transmitted is transferred in the base band or in the intermediate frequency level. In this case, the transmitting receiver and the receiving transmitter operate either synchronously or plesiochronously with respect to each other.

Whereas, in the synchronous transmission process, the phase relationship between the transmit and receive clocks is random, in a plesiochronous operation of the transmitter and receiver, there is a deviation of the clock frequencies from each other, which can reach an order of magnitude of approximately $10^{-5}$. Both phenomena lead to disturbances in the switching of digital service channels, which are intended to be accessible in the repeater, and therefore are removed from the signal to be transmitted and later reinserted into it.

These disturbances originate from the fact that, at points at which an edge (control edge) of a receive clock obtained from the received signal that is controlling the sampling of an incoming digital service-channel signal coincides in time with an edge (control edge) of a transmit clock controlling the re-insertion of the digital service-channel signal, the assignment of the digital service-channel signal bits that are to be inserted into the signal being transmitted to the transmit clock is not clear-cut.

This condition occurs with a certain probability after each new start-up during the synchronous operation of the transmitter and the receiver and random phase of the clocks with respect to each other. During plesiochronous operation, it occurs in all cases, with the pulse repetition rate of the differential frequency of the two clocks.

Avoidance of these disturbances, up to now, has required special adaptation measures, such as the interposition of elastic storages for the insertion of padding bits into the pulse frame to be transmitted, for extraction of data bits from it (see, for example, publication ANT 166903.87 of ANT Nachrichtentechnik GmBH, page 2, middle column).

Measures of this type are time-consuming and therefore expensive and liable to malfunction.

SUMMARY OF THE INVENTION

The invention contemplates a simple circuit arrangement for the through connection of digital service channels in radio relay repeaters. The circuit arrangement is adapted for switching an externally accessible digital service channel formed by additional bits within a digital data signal through the radio relay repeater. The circuit includes a receiving end having a means for removing a digital service channel signal from a received digital data signal. The digital data signal includes a receive clock in the form of a square-wave signal with a predetermined mark/space ratio. At a transmitting end, the circuit includes a means for re-inserting the digital service channel signal into the transmitted digital data signal. The transmitted digital data signal includes a transmit clock in the form of a square-wave signal with a predetermined mark/space ratio. An output control circuit is connected to the receiving and transmitting ends for shifting the bits of the digital service channel signal arriving from the receiving end by a time depending on the phase of the receive clock derived from the received digital data signal with respect to the transmit clock, so that the digital service channel signal is re-inserted at the pulse repetition rate of the transmit clock.

With the circuit arrangement according to the invention, it becomes possible, by means of an artificially-produced time shift in the digital service-channel signal bits incoming from the receiver at points at which control edges of the receive clock and of the transmit clock threaten to coincide in time, to eliminate the undesirable condition described above. Bit errors caused by the time shift appear only during plesiochronous operation and result in an error rate of the order of magnitude of the frequency deviation between the transmit and receive clocks. This error rate is negligible in the case of the requirements for transmission quality generally applicable for service channels.

One contemplated embodiment provides for a buffer to which the received digital service-channel signal is applied synchronously with the receive clock, and from which it is outputted with the transmit clock. The time shift is produced by a changeover switch, which inverts the transmit clock controlling the output of the service-channel from the buffer, which is present as a square-wave signal, when there is a threat of coincidence of the control edges of the receive clock and transmit clock. The control edge of the transmit clock controlling the output of the service-channel signal bits is thus shifted in time by 180 degrees and a coincidence of the control edges of the clocks is thereby ruled out. By adjusting the threshold of the threshold switch, a critical separation of the clock control edges from each other can be adjusted. If the separation drops below this value, a coincidence of the control edges is assumed and the clock controlling the output of the service-channel signal bits is inverted.

In a further embodiment of the circuit arrangement according to the invention, a changeover switch normally switches the service-channel signal coming from the receiver directly to a subsequent synchronizing circuit, but, in the case of a threatening coincidence in time of the control edges of the receive clock and the transmit clock, switches it over to a second signal path leading through a buffer and delaying the service-channel signal. The clock for the buffer delaying the service-channel signal may be controlled to avoid coincidence.

DETAILED DESCRIPTION OF THE INVENTION

Figure 1:
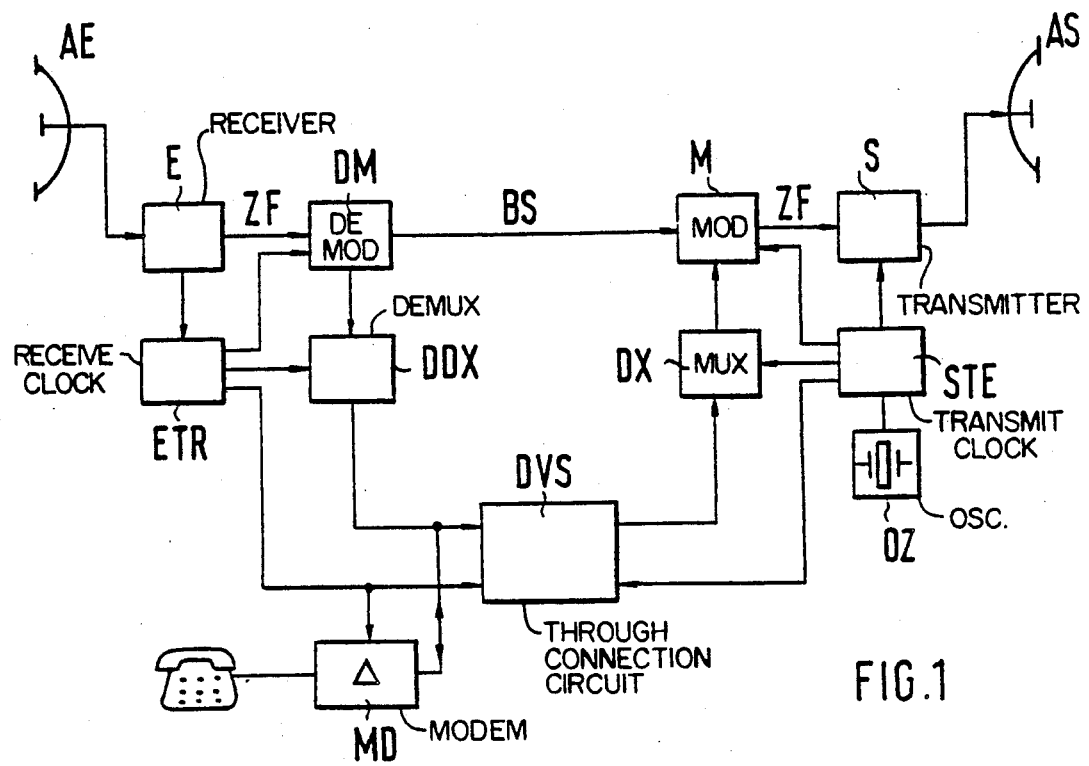
FIG. 1 is a block diagram showing the connection of the circuit arrangement according to the invention in a radio relay repeater.

A repeater of a digital radio relay connection is shown schematically in FIG. 1. The digital useful signal, modulated onto a high-frequency carrier, passes through a receiving antenna AE to a receiver E. In this receiver, the useful signal is transformed to the intermediate frequency level ZF and is fed to a demodulator, which recovers the base frequency signal BS from the IF signal. This base signal is transferred to the transmitting side of the repeater. It passes through a modulator M, which prepares an intermediate-frequency ZF, to a transmitter S which outputs it through a transmission antenna AS, with the signal modulated onto a high-frequency carrier.

The demodulator and modulator are complexly constructed circuits, adapted to the type of modulation used and the structure of the pulse frame to be transmitted, and require a signal clock for operation. This is recovered from the received signal on the receiving side, by means of a circuit for receive clock recovery ETR. On the transmitting side, it is reformed in a transmit clock generation circuit STE, which is controlled by a quartz-stabilized oscillator OZ in plesiochronous systems.

The signal clocks on the receiving side (receive clock ET) and the transmitting side (transmit clock ST) are usually only approximately synchronous (plesiochronous), since the oscillator, in the preceding repeater, deviates slightly in its frequency from the oscillator OZ. The modulator M therefore contains circuits that adapt the transferred pulse frame to the new transmit clock.

A plesiochronous operation can be replaced by synchronous operation if the recovered receive clock is switched through to the transmitting side and is used as a transmit clock, instead of a separate oscillator clock. In that case, the above-mentioned adaptation circuits carry out only the adaptation of the phases of the transmit and receive clocks.

The pulse frame usually contains auxiliary bits, which carry one or more digital service channels. Service channels of this type are used for signaling and for speech connections. If a digital service channel is supposed to be accessible at a repeater, e.g., if a speech connection is supposed to be operated from the repeater via the service channel, then the auxiliary bits carrying the service channel must be removed from the pulse frame at the receiving end and reinserted at the transmitting end. The former is achieved by means of a service-channel demultiplexer DDX and the latter by means of a service-channel multiplexer DX. The digital service channel separated from the service channel demultiplexer can be used for a speech connection, for example, by means of a Δ modem MD.

In order to be able to speak, however, the service channel must be connected through to the transmitting end. This cannot be carried out directly in plesiochronous operation, because of the different clock frequencies on the receiving end and the transmitting end, and, in synchronous operation, because of the different random phases of the clocks on the receiving end and the transmitting end, but an adaptation of the service-channel signal to the corresponding transmit clock must be carried out.

Figure 2:
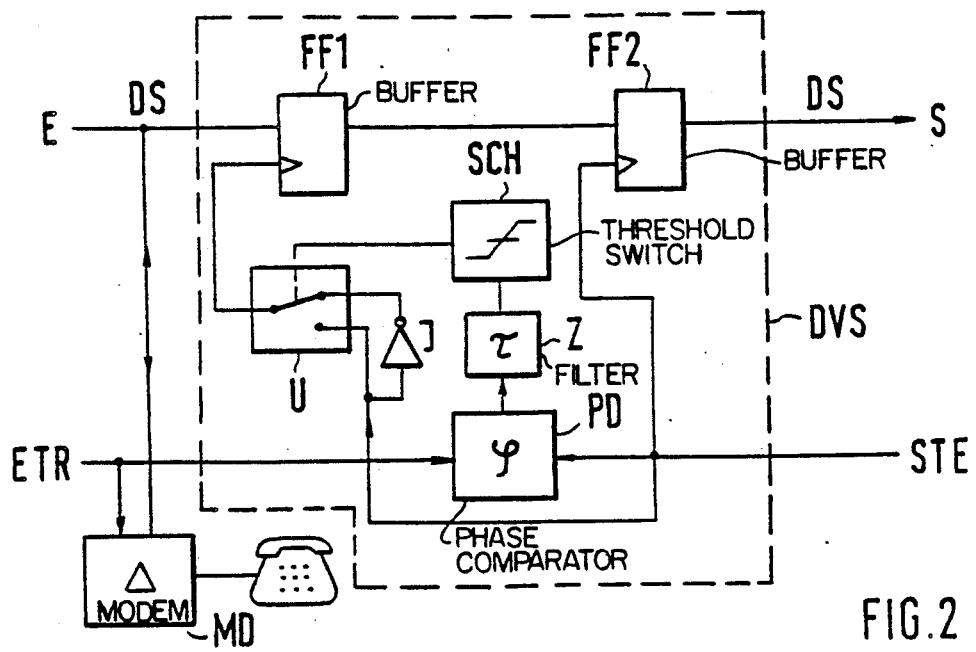
FIG. 2 is a block diagram showing a first exemplifying embodiment of the circuit arrangement according to the invention in a generally functional representation.
Figure 3:
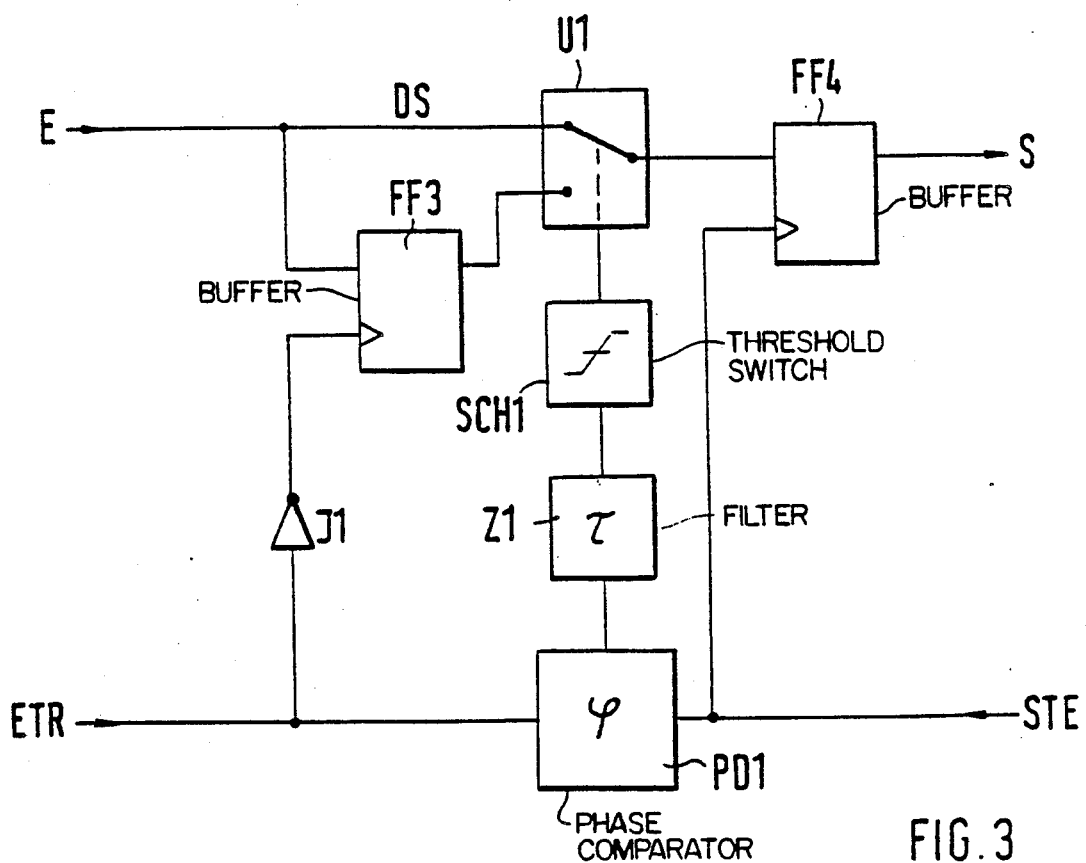
FIG. 3 is a block diagram showing a second exemplifying embodiment in an identical representation.

For this, in FIG. 1, a through connection circuit DVS is provided, to which the invention relates, and exemplifying embodiments of which are shown in detail in FIGS. 2 and 3.

The through connection circuit in FIG. 2 contains a first buffer FF1, to which is fed the service channel signal DS from the demultiplexer DDX or, if the station-internal speech connection is in operation, from the Δ modem MD in a bitwise manner.

The first buffer is fed at its clock input with the transmit clock ST originating from the transmit clock generating circuit STE. A signal synchronized with the transmit clock then appears at the output of the first buffer, but this may be burdened by errors.

The reason for the errors produced is a coincidence in time of the control edges of the receive clock and the transmit clock controlling the introduction into storage and the output from the storage.

Figure 4:
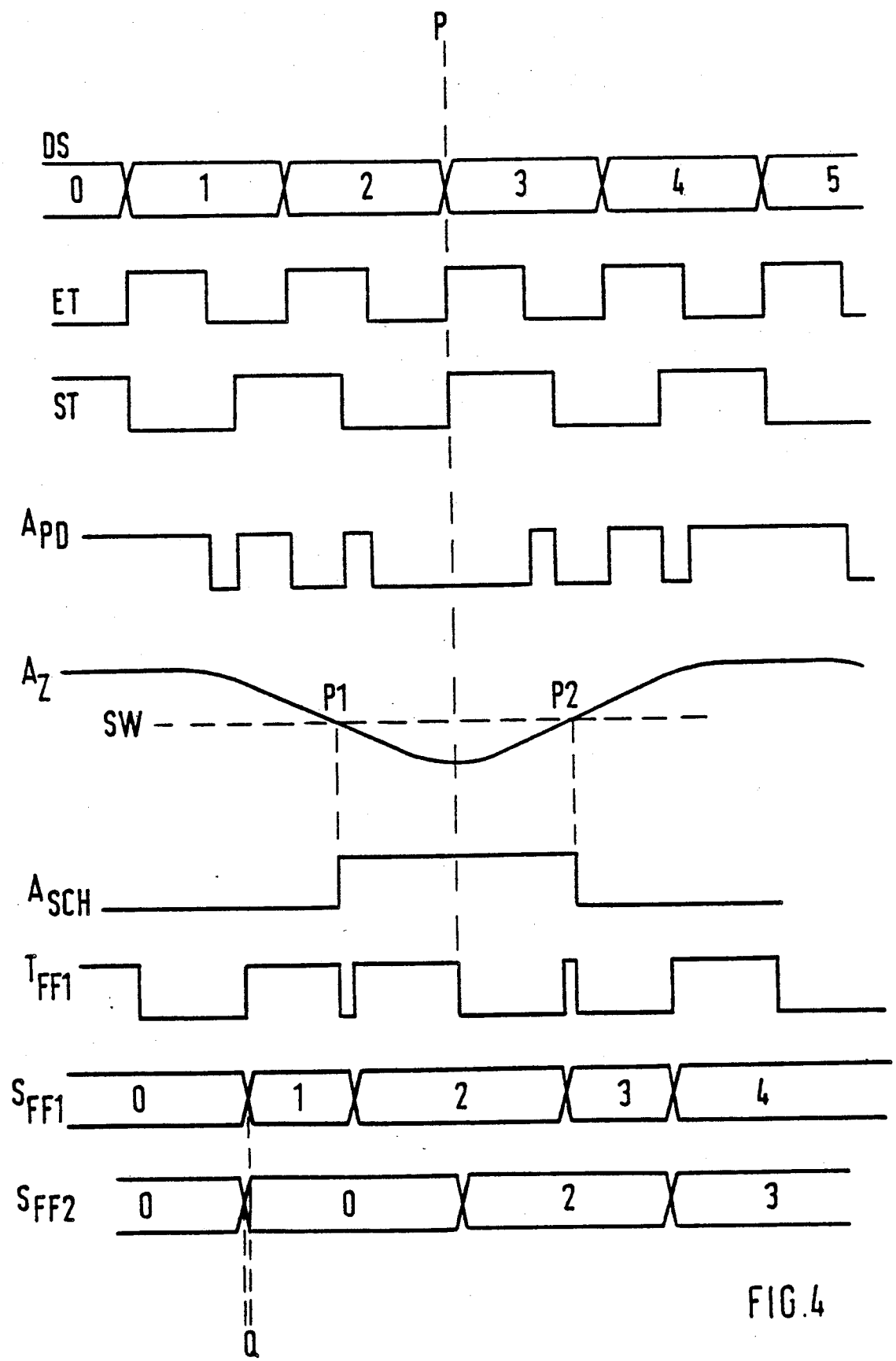
FIG. 4 shows signal timing of the first exemplifying embodiment.

This can be recognized from FIG. 4.

In this case, the incoming bit sequence 0 ... 5 of the service-channel signal DS is shown at the very top. This is made available synchronously with the positive edge of the receive clock ET at the input of the buffer. The output from the buffer takes place with the transmit clock ST, which is different from the receive clock, as is shown in greatly exaggerated form in FIG. 4. At a time P, the positive edges of the clocks coincide in time. At this point, it is uncertain whether the content of the bit 2 or already the content of bit 3 is outputted from the buffer. Since the edges of the clocks, as a rule, show only a very slow shift with respect to each other, the transmission can be disturbed over a longer period by this coincidence. In practice, a speech connection through several repeaters is made impossible thereby.

It is true that, in synchronous operation, there is no frequency deviation of the clocks from each other. The mutual phase position of the clocks, which is adjusted newly and randomly after every start-up of a clock, is however unfavorable with a certain probability, i.e., the two positive edges of the clocks are close together in time, so that even a slight variation in time of one of the clocks leads to disturbances.

The circuit arrangement shown in FIG. 2 contains a changeover switch U, which is driven in accordance with the phase position of the two clocks with respect to each other, and which inverts the transmit clock fed to the buffer FF1 as soon as there is a threat of phase coincidence between the two clocks. The latter is determined by a phase comparator PD, to which the two clocks are fed as square-wave signals with a mark/space ratio of 1:1. The phase comparator, via a low-pass filter Z, drives a threshold switch SCH which actuates the changeover switch U. To invert the transmit clock, an inverter I is connected ahead of one of the inputs of the changeover switch.

FIG. 2 contains another buffer FF2 for exact re-synchronization of the service-channel signal present at the output of the first buffer with the transmit clock. From the output of the additional buffer, the service-channel signal DS is outputted to the transmitter S of the repeater. The clock input of the additional buffer is acted on by the transmit clock.

FIG. 4 is a schematic representation of the timing of the through connection circuit. The digitally operating phase comparator PD outputs an output signal $A_{PD}$, which, for example, takes on H-levels if the levels of the two clocks are antivalent to each other and takes on 0-levels when the clocks show identical levels. This output signal is smoothed by the low-pass filter and is fed to the threshold switch as a control signal $A_Z$. If the in-phase portions of the two clocks are strongly predominant, then the level of the control signal $A_Z$ decreases to such an extent that, at a time P1, it drops below a preset threshold value SW and thereby causes the reversal of the changeover switch by the output signal $A_{SCH}$ of the threshold switch. After this, the changeover switch inverts the transmit clock fed to the buffer until the portions of the receive clock and transmit clock opposite in level to each other have increased again to such an extent at a time P2 that a coincidence in time of the controlling clock edges is no longer probable.

Through the inversion of the transmit clock, during the time in which the changeover is effective, the content of the bits present at the input of the buffer FF1 at the negative edge of the transmit clock are switched through to the repeater output. The clock signal $T_{FF1}$ present at the clock input of the buffer FF1 and the bit sequence $S_{FF1}$ present at the output of the buffer FF1 are also shown in FIG. 4.

In the re-synchronization, which takes place with the same clock as the removal of the service-channel signal from the buffer, as is shown by the output signal $S_{FF2}$ of the additional buffer shown in FIG. 4, a bit (e.g., bit 1) is lost. However, this occurs only during plesiochronous operation and leads to disturbances which are practically not noticeable when the service channel is used for a speech connection. In synchronous operation of the repeater, the phase of the clock at the transmitting side fed to the buffer does not change during operation. It remains in the original position or, if this position is unfavorable, is inverted from the start.

Problems during output of the service-channel signal taken over with the transmit clock from the additional buffer, such as could be expected on the basis of the identity of the clocks used and the related synchronous course of transfer and output, do not occur because the transfer clock in this case, because of a longer transit time, reaches the first buffer somewhat later than the output clock directly fed to the second buffer. The two clocks therefore, although they were taken from the same source, show a permanent phase difference, which reliably prevents a phase coincidence, such as can occur between the receive clock and transmit clock, as described above. The representation in FIG. 4 shows this phase difference at the time Q.

The exemplifying embodiment of the circuit arrangement according to the invention shown in FIG. 3 also shows a buffer FF3 and a changeover switch U1, which is driven by a phase comparator PD1 via a low-pass filter Z1 and a threshold switch SCH1. However, the mode of action of the circuit arrangement shown in FIG. 3 differs from that of the exemplifying embodiment shown in FIG. 2. Whereas, in that case, in the case of phase coincidence of the receive clock and transmit clock, the transmit clock controlling the output of the service-channel signal from the buffer is inverted, in this case the service-channel signal is switched through directly on a first signal path and is transmitted on a second signal path with a delay of one-half clock period. The delay is achieved by means of the buffer FF3, to whose clock input the receive clock is fed via an inverter I1. The changeover switch U1 switches to the delaying signal path if there is a threat of phase coincidence between the transmit and receive clocks and, in this way, produces a time shift of the service-channel signal bits. A re-synchronization is carried out by means of a second buffer FF4.

Figure 5:
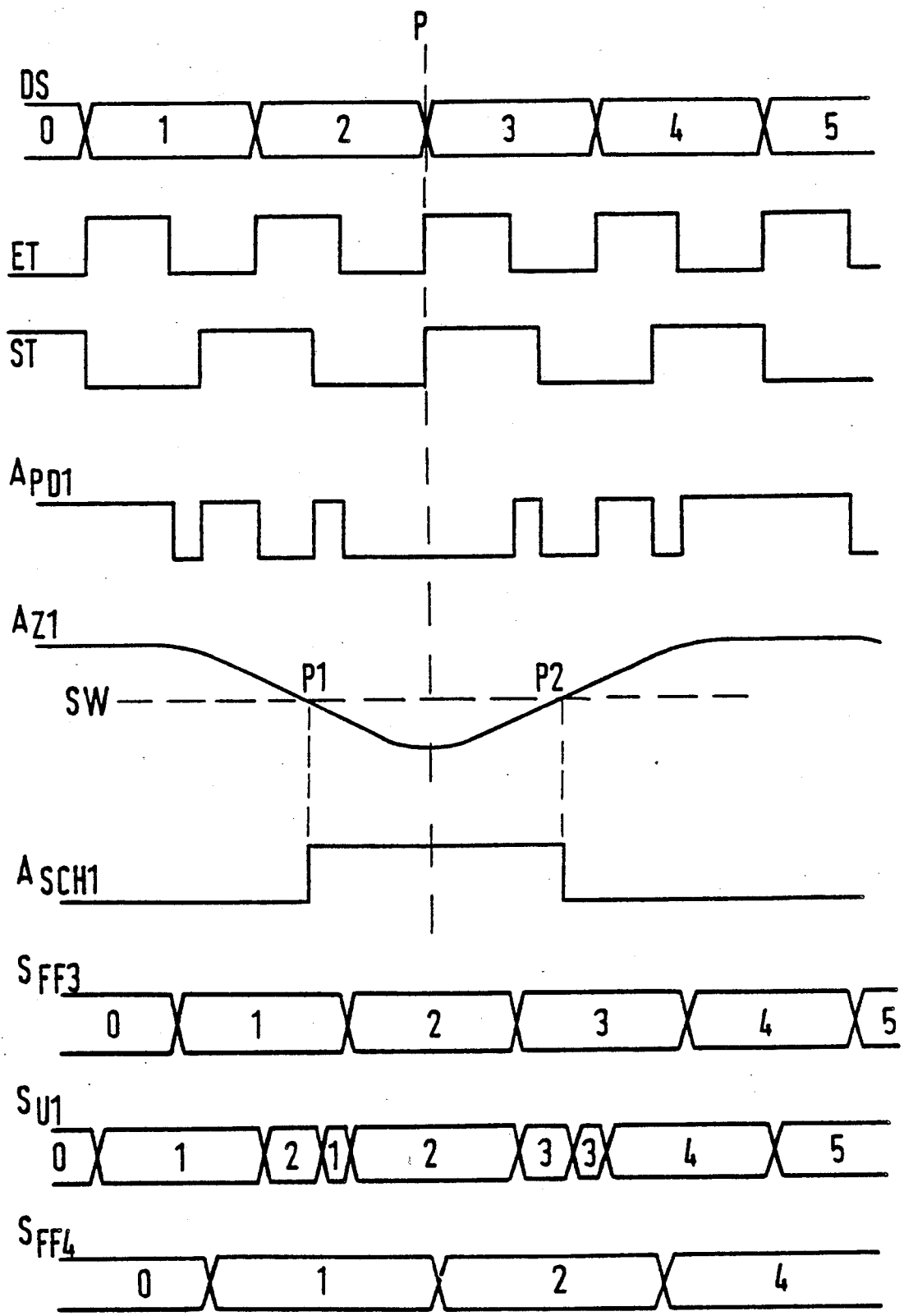
FIG. 5 shows signal timing of the second exemplifying embodiment.

FIG. 5 shows the signal course $S_{FF3}$ at the output of the buffer FF3, the signal course $S_{U1}$ at the output of the changeover switch, and the signal course $S_{FF3}$ at the output of the second buffer FF4, together with the signals DS, ET, ST, $A_{PD1}$, $A_{Z1}$ and $A_{SCH1}$ already explained in connection with FIG. 4. It can also be determined in this case that individual bits (in this case, for example, bit 3) can be lost.

Figure 6:
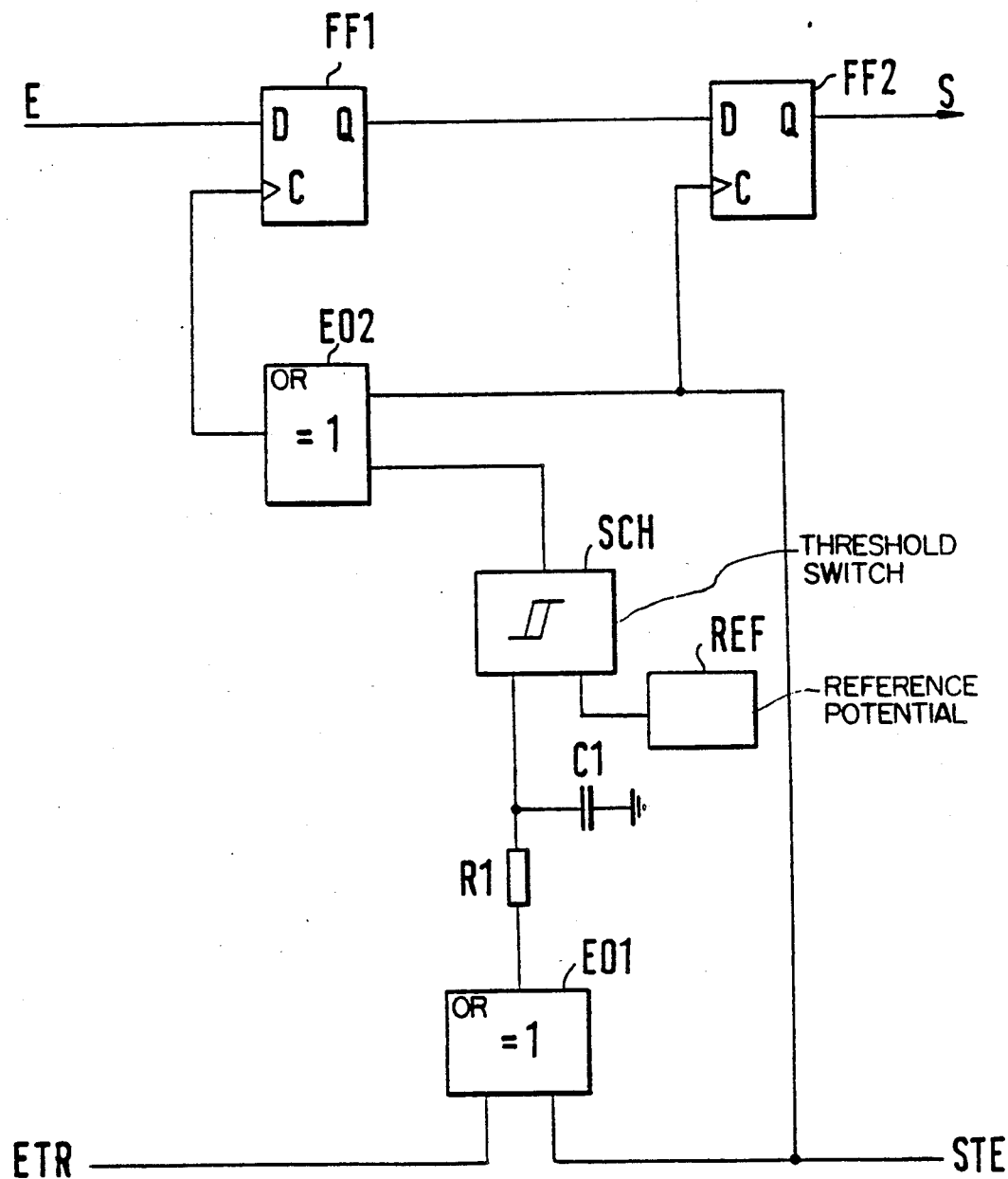
FIG. 6 is a schematic diagram of an exemplifying embodiment of the invention.

In FIG. 6, finally, the circuit-engineering conversion of the exemplifying embodiment according to FIG. 2 is shown. In this case, an exclusive-OR gate EO1 and EO2 is used in each case as a phase comparator (PD in FIG. 2) and as a changeover switch (U in FIG. 2). The low-pass filter (Z in FIG. 2) consists of a simple RC element, made up of a resistor R1 and a capacitor C1. D flip-flops are used as buffers FF1 and FF2. A Schmitt-Trigger with a reference potential REF supplied from the outside is used as a threshold switch SCH.

What is claimed is:

1. A circuit arrangement for switching an externally accessible digital service channel formed by additional bits within a digital data signal through a repeater of a radio relay network, comprising:

means, at a receiving end, for removing a digital service-channel signal transmitted with the aid of the additional bits from a received digital data signal, said received digital data signal including a receive clock (ET) being present in the form of a square-wave signal with a predetermined mark/space ratio;

means, at a transmitting end, for re-inserting the removed digital service-channel signal into a transmitted digital data signal, said transmitted digital data signal including a transmit clock (ST) present in the form of a square-wave signal with a predetermined mark/space ratio; and an output control circuit, connected to said remaining means and re-inserting means for shifting removed digital service-channel signal in time depending on the phase of the receive clock (ET), derived from the received digital data signal with respect to the transmit clock, whereby the removed digital service-channel signal is re-inserted at a pulse repetition rate of the transmit clock.

2. A circuit arrangement as claimed in claim 1, wherein the output control circuit includes:

a buffer (FF1) to which the digital service-channel signal (DS) is applied after being synchronized with the receive clock and from which it is outputted bit by bit at the pulse repetition rate of the transmit clock (ST);

a changeover switch (U) for applying the transmit clock (ST) either directly or through an inverter (I) to a clock input of the buffer (FF1); and a phase comparator (PD) for receiving the receive clock and the transmit clock and providing an output to a subsequent low-pass filter (Z) having an output connected to a threshold switch (SCH) for controlling the changeover switch (U), so that the threshold switch (SCH) causes the changeover switch (U) to select the transmit clock (ST) that passed through the inverter (I) when the clocks (ET, ST) applied to the phase comparator (PD) are in phase over more than a predetermined portion of their clock period.

3. A circuit arrangement as claimed in claim 2, wherein the changeover switch (U) is formed by an EXCLUSIVE-OR gate (EO2).

4. A circuit arrangement as claimed in claim 3, wherein the buffer (FF1) is followed by a synchronizing element (FF2) whose signal and clock inputs are fed with the output signal from the buffer (FF1) and the transmit clock (ST), respectively.

5. A circuit arrangement as claimed in claim 4, wherein the phase comparator is formed by an EXCLUSIVE-OR gate.

6. A circuit arrangement as claimed in claim 3, wherein the phase comparator is formed by an EXCLUSIVE-OR gate.

7. A circuit arrangement as claimed in claim 2, wherein the buffer (FF1) is followed by a synchronizing element (FF2) whose signal and clock inputs are fed with the output signal from the buffer (FF1) and the transmit clock (ST), respectively.

8. A circuit arrangement as claimed in claim 7, wherein the phase comparator is formed by an EXCLUSIVE-OR gate.

9. A circuit arrangement as claimed in claim 2, wherein the phase comparator is formed by an EXCLUSIVE-OR gate.

10. A circuit arrangement as claimed in claim 1, wherein the output control circuit includes:
    a buffer (FF3) into which the digital service-channel signal (DS) may be fed bit by bit at the pulse repetition rate of the receive clock (ET) and from which it can be outputted with a phase shift;
    a changeover switch (U1) for applying the digital service-channel signal either directly or from an output of the buffer (FF3) to an output;
    a subsequent synchronizing element (FF4) connected to the changeover switch output and clocked by the transmit clock (ST); and
    a phase comparator (PD1) receiving the receive clock and the transmit clock and providing an output to a low-pass filter (Z1) having an output connected to a threshold switch (SCH1) for controlling the changeover switch (U1), so that the threshold switch causes the changeover switch (U1 to switch the phase-shifted service-channel signal when the clocks (ET, ST) applied to the phase comparator (PD1) are in phase over more than a predetermined portion of their clock period.

11. A circuit arrangement as claimed in claim 10, wherein the phase comparator is formed by an EXCLUSIVE-OR gate.

12. A circuit arrangement as claimed in claim 10, additionally comprising:
    an inverter (I1) preceding a clock input of the buffer, the receive clock (ET) being fed to the buffer (FF3) through said inverter to provide the phase shift.

13. A circuit arrangement as claimed in claim 12, wherein the phase comparator is formed by an EXCLUSIVE-OR gate.

* * * * *

UNITED STATES PATENT AND TRADEMARK OFFICE
CERTIFICATE OF CORRECTION

PATENT NO. : 5,107,488
DATED : April 21, 1992
INVENTOR(S) : Schreder et al

It is certified that error appears in the above-identified patent and that said Letters Patent is hereby corrected as shown below:

Column 8, line 14, change ".(U1" should read --(U1)--.

Signed and Sealed this

Fifth Day of October, 1993

Attest:

BRUCE LEHMAN

Attesting Officer          Commissioner of Patents and Trademarks

UNITED STATES PATENT AND TRADEMARK OFFICE
CERTIFICATE OF CORRECTION

PATENT NO. : 5,107,488

DATED : April 21, 1992

INVENTOR(S) : Wolfgang Schreder, et al.

It is certified that error appears in the above-identified patent and that said Letters Patent is hereby corrected as shown below:

On the title page, item (75): Inventors, insert --Peter Hotz, Engelsbrand--.

This certificate supersedes Certificate of Correction issued October 5, 1993.

Signed and Sealed this

Twenty-first Day of December, 1993

*Attest:*

BRUCE LEHMAN

*Attesting Officer*     *Commissioner of Patents and Trademarks*